United States Patent
Balz

(10) Patent No.: US 8,699,598 B2
(45) Date of Patent: Apr. 15, 2014

(54) METHOD AND DEVICE FOR GRAPHICALLY REPRESENTING THE I AND/OR Q COMPONENTS OF DIGITALLY MODULATED HIGH FREQUENCY SIGNALS

(75) Inventor: Christoph Balz, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 3147 days.

(21) Appl. No.: 10/498,947

(22) PCT Filed: Dec. 12, 2002

(86) PCT No.: PCT/EP02/14158
§ 371 (c)(1),
(2), (4) Date: Jun. 15, 2004

(87) PCT Pub. No.: WO03/052430
PCT Pub. Date: Jun. 26, 2003

(65) Prior Publication Data
US 2005/0071099 A1 Mar. 31, 2005

(30) Foreign Application Priority Data
Dec. 14, 2001 (DE) .................. 101 61 602

(51) Int. Cl.
*H04L 5/12* (2006.01)
(52) U.S. Cl.
USPC ........... 375/261; 375/228; 375/280; 375/316; 375/340; 702/66; 702/67; 348/180; 348/186

(58) Field of Classification Search
USPC ........... 375/261, 228, 280, 316, 340; 702/67, 702/66; 348/180, 186
See application file for complete search history.

(56) References Cited

U.S. PATENT DOCUMENTS

| | | | |
|---|---|---|---|
| 4,818,931 A | 4/1989 | Naegeli et al. | |
| 4,918,708 A | 4/1990 | Pottinger et al. | |
| 5,379,323 A | 1/1995 | Nakaya | |
| 5,438,590 A * | 8/1995 | Tzukerman et al. | 375/259 |
| 6,236,690 B1 * | 5/2001 | Mimura et al. | 375/334 |
| 6,324,224 B1 | 11/2001 | Ikeda | |
| 6,920,174 B1 * | 7/2005 | Wolf et al. | 375/228 |

FOREIGN PATENT DOCUMENTS

| | | |
|---|---|---|
| DE | 195 47 896 A1 | 12/1995 |
| DE | 198 51 093 A1 | 11/1998 |
| EP | 0 687 074 A2 | 5/1995 |
| EP | 1 079 577 A2 | 8/2000 |
| WO | WO 00/28711 * | 5/2000 |

* cited by examiner

*Primary Examiner* — Leila Malek
(74) *Attorney, Agent, or Firm* — Ditthavong Mori Steiner, P.C.

(57) ABSTRACT

A method and device for graphically representing the I and/or Q components of digitally modulated high frequency signal are described, in which the I or Q components measured in a temporally successive manner are graphically represented side-by-side on a display device.

5 Claims, 3 Drawing Sheets

METHOD AND DEVICE FOR GRAPHICALLY REPRESENTING THE I AND/OR Q COMPONENTS OF DIGITALLY MODULATED HIGH FREQUENCY SIGNALS

FIELD OF THE INVENTION

The invention relates to a method for the graphic representation of the I and/or Q components of digitally modulated high-frequency signals such as quadrature amplitude modulated (QAM) signals or vestigial sideband modulated (VSB) signals, and an arrangement for the implementation of this method.

BACKGROUND OF THE INVENTION

To evaluate and monitor modern communication systems, the digitally modulated high-frequency signals used in this context must be recorded using measurement technology. Digitally modulated high-frequency signals of this kind are described by the I/Q configuration diagram. It is already known, for example, from DE 195 47 896 A1, that the configuration diagram for relatively high-order digital modulations of this kind, such as 64 QAM, can be presented to the observer in a direct graphic manner on a screen.

It is also already known, that the I/Q components measured in temporal succession in the I/Q-demodulator of a receiver can be represented graphically on screen either separately or optionally also superimposed simultaneously in such a manner that the spacing of the value clouds representing the individual symbols in the configuration diagram appears on screen as a so-called "eye-diagram." The so-called "eye-opening" displayed in this manner provides a measure for the quality of the digital modulation and the signal transmission.

One disadvantage of these known methods of representation is that they fail to provide adequate information about the temporal course of any interference which may be present, for example, any periodically-occurring interfering pulses. Moreover, with the known method of representation, only a fraction of the I/Q data actually present, which are registered within a short time window, are displayed and presented on screen. A large number of measured values are not registered at all, and the representation therefore contains considerable gaps.

SUMMARY OF THE INVENTION

A need therefore exists to provide a method for graphic representation of the I/Q components of digitally modulated high-frequency signals, which avoids these disadvantages and also provides information about the temporal course of the signal represented. Another need exists to provide an arrangement, with which such I/Q components of digitally modulated high-frequency signals can be represented in a seamless manner.

These and other needs are addressed in accordance with one aspect of the present invention by a method for the graphic representation of the I component or Q component of digitally modulated high-frequency signals, characterised in that the I or Q components measured in temporal succession are graphically represented side by side.

Another aspect relates to an arrangement for the graphic representation of the I/Q-components of digitally modulated signals, characterized by an I/Q-demodulator (1) for determining successively the I and/or Q components of the digitally modulated high-frequency signal to be represented, of which the I-output and/or Q-output is connected to a large number of threshold detectors (4) arranged in parallel, which, in each case, are adjusted to different threshold values (0 to n) within the display range (−8 to +8 for 64 QAM) for the I/Q-components, and of which the statuses are scanned and collated at time intervals to form result values and graphically represented on a display device (8).

With the method according to the invention, the I and/or Q components measured in temporal succession are represented side by side on a graphic display. Accordingly, time is also graphically represented as a further dimension. As a result, a periodic interference of the signal, for example, which cannot be registered reliably in any other manner or which cannot be registered because of the rarity of its occurrence, can be identified with certainty. However, the so-called minimum eye-opening, of which the temporal course is represented graphically via the distance between the graphically represented I/Q components, can be measured in exactly the same manner as in the above-mentioned eye-diagram. The method according to the invention is suitable for the graphic representation of all conventional digitally modulated high-frequency signals, which are determined with reference to I components or Q components or combined I/Q components, for example, conventional quadrature amplitude modulated (QAM) signals or vestigial sideband modulation (e.g. 8VSB), which is conventional in the USA.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The invention will now be explained in greater detail with reference to drawings of exemplary embodiments. The drawings are as follows.

DETAILED DESCRIPTION OF THE PREFERRED EMBODIMENT

Figure 1:
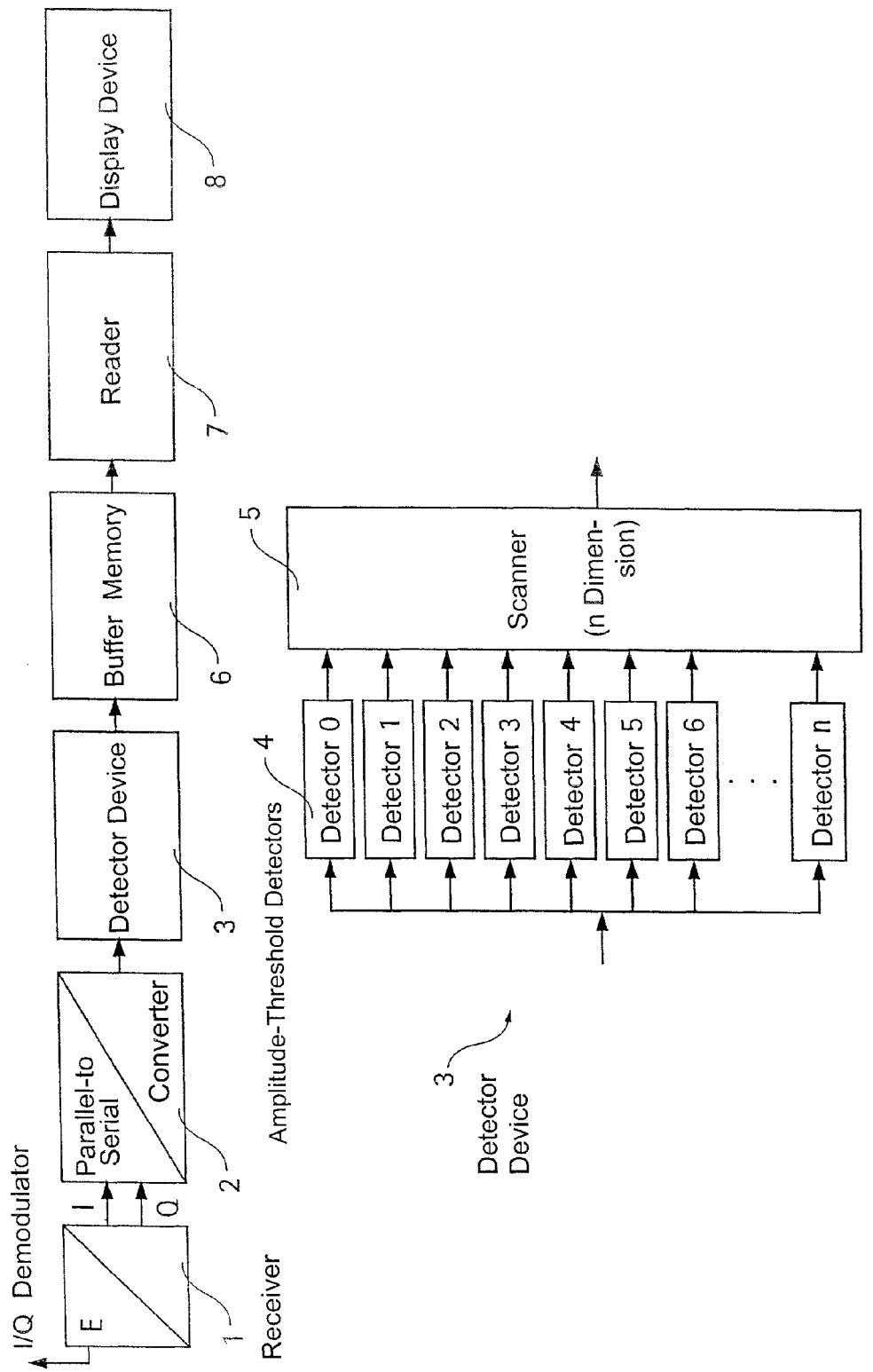
FIG. 1 shows an outline circuit diagram of the arrangement according to the invention.

FIG. 1 shows the outline circuit diagram for an arrangement for the implementation of a method according to the invention, for example, with a 64 QAM signal. The QAM-modulated high-frequency signal is demodulated in an I/Q demodulator of a receiver 1. The I/Q components continuously demodulated in temporal succession are provided in parallel for further processing at the output of the demodulator. In the exemplary embodiment shown, both the I and Q components are to be evaluated. I and Q components arriving in parallel are therefore converted in a converter 2 into serial I/Q components and supplied to a detector device 3, which consists of a large number n of amplitude-threshold detectors 4 arranged in parallel, each of which is tuned to a different threshold value 0 to n within the representational range of the relevant configuration diagram, for example, with 64 QAM, within the range −8 to +8. The outputs of these detectors 4 are connected to a scanner 5, by means of which the relevant status of the n detectors 4 is scanned at regular time intervals, for example, 100 ms. The scanning result is placed into intermediate storage as a digital result value in a buffer memory 6, from which it is read out at regular time intervals by a reader 7 and displayed graphically on the screen of a calculation and display device 8 (display and digital signal processor).

Figure 2:
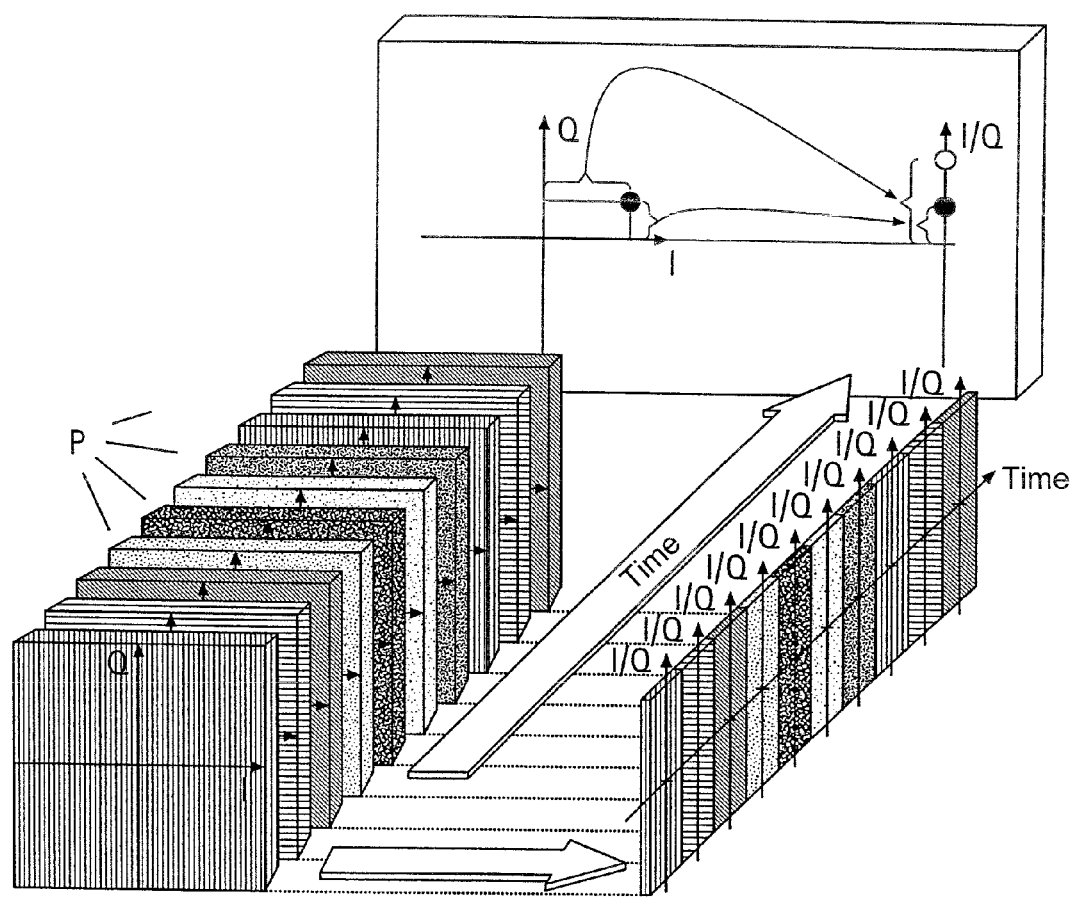
FIG. 2 shows an outline diagram of the method according to the invention.

FIG. 2 shows schematically the principle of the method according to the invention in the context of a QAM signal, of which the I and Q components are to be evaluated. The I and Q components provided in parallel in temporal succession at the output of the I/Q demodulator are collated to form configuration-diagram packets P, for example, 100 ms in length. As shown in FIG. 2, the I-component is rotated through 90° and is therefore orientated in the same vertical direction as the Q-component. This provides a one dimensional representation of the configuration diagram. In this context, no information is lost. These one dimensional I/Q representations of configuration diagram packets P generated in temporal succession are now graphically represented side by side, and time is therefore included in the display as an additional dimension.

In terms of memory technology, this is achieved with an arrangement according to FIG. 1, in that the parallel I/Q components are converted into serial components in the converter 2 and supplied to the detector device 3 as equivalent components. Each of the n detectors 4 establishes which of the I and Q components supplied in series corresponds to the value (for example, 0 to 255) relevant to it. If an I or Q component corresponds to the relevant threshold value of a detector, the detector is activated, and its output is set from 0 to 1. After a given measuring time of, for example, 100 ms, the scanner 5 then determines which of the detectors 0 to n have been activated during this measuring time. The result is placed into intermediate storage as a digital result value in the buffer memory 6. The results from all n detectors are therefore collated in this result value, which occurred in the measured signal during the period since the last scanning of the detectors. Accordingly, each digital result value has as many binary digits as there are detectors. Each of these digits therefore accurately characterises one of the possible I or Q components.

Another possibility is for the result values to be multi-digit numbers, which can be interpreted as the address of an array. Each of these digits again characterises an I or a Q value. The value of these digits (content of the addresses) is determined by the number of allocated measured values occurring since the resetting of the detectors. Accordingly, each individual event increments the content of the addresses. In this manner, the frequency of a measured value is known in addition to its mere occurrence. This possibility can be used particularly advantageously, for example, in order to represent the frequency distribution of the I/Q components occurring, graphically, for example, by means of a colour scale.

The result values stored in the buffer memory 6 are read out by the reader 7 and represented horizontally side by side in the graphic display 8. In this manner, the eye-opening of the digitally modulated high-frequency signal is obtained, and indeed, in dependence upon time. Since the maximum time-representation range of the display is exhausted after a short time, the time axis must then be re-scaled. For this purpose, the various result values are collated in an appropriate manner for the graphic representation, so that, in this case also, all of the I/Q components occurring since the beginning of the measurement are registered and represented.

The collation of result values can take place in two different ways.

The result values are collated, stored and then graphically represented. This method is very memory-efficient, but does not allow a retrospectively extended representation (magnification in the time range). The maximum number of result values to be stored overall is constant, that is, independent of the currently represented time range.

Another possibility is to store all the result values separately, collating them only for the graphic display, without changing the result values themselves in this context. This method, which is very memory-intensive especially with long measurements, does allow a subsequent magnified representation of any positions along the measured curve. However, considerably more space is required in the memory.

Figure 3:
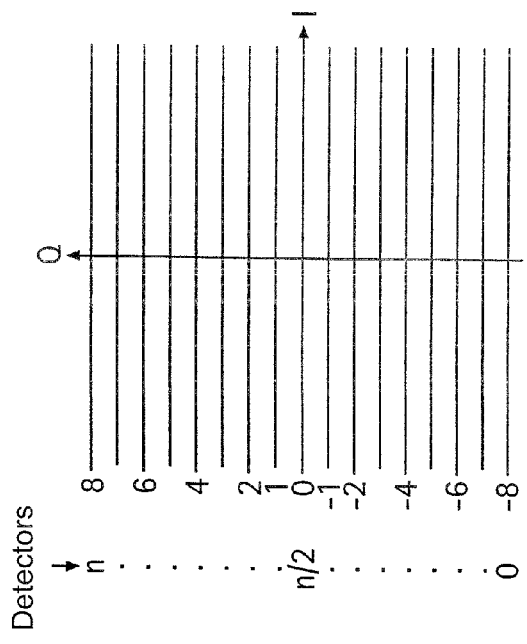
FIG. 3 shows a first example of a measured result.

FIG. 3 shows the measured results for a 64 QAM signal with 20 second display time. The signal was subjected to interference every 2 seconds with 25 ns wide pulses. All of the pulses were recorded by the device (continuous recording). For each pulse, at least two disturbed measuring points (I and Q components) are visible, depending on whether only one symbol was disturbed or two symbols. In the display diagram according to FIG. 3, the vertical decision-field boundaries of the configuration diagram (−8 to +8) are shown as horizontal lines. The I and Q components collated to form a result value are represented as block strips within the 20 seconds between these decision fields boundaries; in this context, the intervening spacing corresponds to the eye-height defined in the eye-diagram. The measured points generated by the interfering pulses are marked in each case by the arrows drawn in dotted lines. In FIG. 3, the associated number n of detectors (e.g. n=255) according to FIG. 1 used in this context is allocated to the vertical decision-field boundaries of the configuration diagram for 64 QAM shown on the right.

Figure 4:
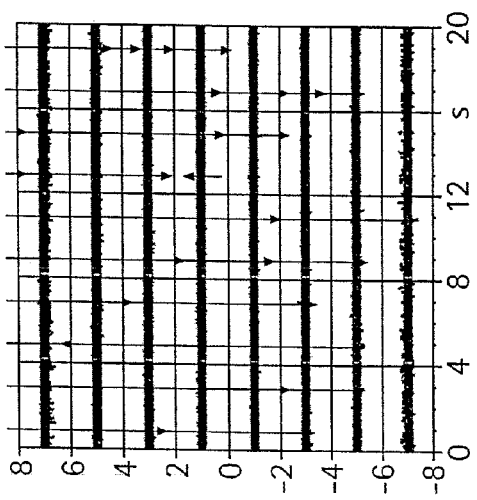
FIG. 4 shows a second example of a measured result.
Figure 4:
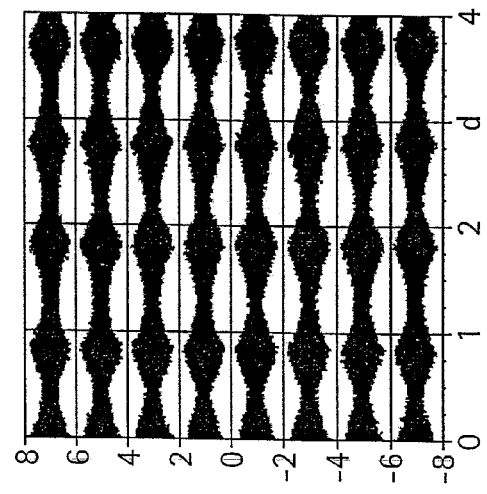

FIG. 4 shows a further measurement and representation with four days display time. Once again, a 64 QAM signal is represented, which is subject to a periodicity of rising and falling interference, which is dependent upon the time of day. In this context, the causes may be, for example, EMV problems or temperature differences. The spacing between two I or Q components represented as horizontally bulging lines again corresponds to the eye-height in the eye-diagram.

The time range to be represented can be configured by the user within wide boundaries. A time range defined by the user (e.g. 1 hour) is initially started in the display within the smallest time range (20 seconds). Once this period has been reached, the device automatically switches into the next highest time range (in this case, 40 seconds, and so on) until finally, the desired time range is represented on the display.

Following this, the display switches to the so-called roll mode, that is, new measured values are appended at the right-hand edge of the display, while the oldest measured values are deleted at the left-hand edge. Accordingly, the full time range specified by the user is visible in the display at all times with the current measured values. The maximum time range which can be represented is 1000 days. A seamless registration of measured values can be achieved even in this operating mode.

In the exemplary embodiment described so far, which is based on 64 QAM, both I and Q components were evaluated and represented in a superimposed manner. Graphic representation of only the I component or only the Q component is, of course, also possible. In this case, the parallel/serial conversion in the converter 2 is dispensed with, and only the I components or the Q components are supplied to the parallel detectors 4. The evaluation and representation remains as described above. A separate, simultaneous representation of the I component and the Q component is also possible, in that the I component, for example, according to FIG. 2, is not directly rotated upwards through 90° in the direction towards the Q component, but is, on the contrary, rotated downwards and then shifted, so that both components are graphically represented on the display as separate, horizontal measured strips.

The arrangement illustrated in FIG. 1 with a large number of threshold detectors arranged in parallel is not only advantageous for the method according to the invention, but could also be advantageously used for the representation of classic configuration diagrams, because it allows a seamless evaluation of all I/Q measured values supplied from the demodulator. In the case of a representation of a classic configuration diagram, only a small fraction of the actually-occurring measured values were ever processed and represented. With the arrangement according to the invention, a 100%-seamless registration of measured values is possible, and interference with very short pulses can also be registered, even if only a single symbol in the transmission has been disturbed.

While the present invention has been described in connection with a number of embodiments and implementations, the present invention is not so limited but covers various obvious modifications and equivalent arrangements, which fall within the purview of the appended claims.

Key to Diagrams

| FIG. 1 | |
| --- | --- |
| Detektor Array | Detector array |
| (Ergebnisvektor) | (result vector) |
| Zwischenspeicher | Buffer memory |
| (Ergebnisvektor) | (result vector) |
| Auslese-Einheit | Readout unit |
| DSP, grafische Darstellung | DSP, graphic display |
| Detektor 0 | Detector 0 |
| Ergebnis-Vektor | Result vector |
| n Dimensionen | n dimensions |

| FIG. 2 | |
| --- | --- |
| Zeit | Time |

| FIGS. 3 and 4 | |
| --- | --- |
| Detektoren | Detectors |

The invention claimed is:

1. An arrangement for providing a graphic representation of I/Q-components of digitally modulated signals, comprising:
   an I/Q-demodulator for determining successively I/Q-components of a digitally modulated high-frequency signal to be represented, said I/Q-demodulator having an I-output and/or Q-output;
   a plurality of threshold detectors arranged in parallel and connected to the I-output and/or Q-output, each of said threshold detectors being adjusted to respective threshold values within a display range for the I/Q-components, and
   means for scanning and collating statuses of the threshold detectors at time intervals to form result values and graphically representing the scanned and collated statuses side by side on a display device, wherein time is plotted as a dimension.

2. An arrangement according to claim 1 wherein:
   the result values are graphically represented on the display device side by side as vertical amplitude values together with decision-field boundaries of corresponding said I/Q-components.

3. An arrangement according to claim 1, further comprising:
   a buffer memory for storing the result values collated at time intervals and
   a reader for reading out the result values stored in the buffer memory for the graphic representation.

4. An arrangement according to claim 3, wherein:
   after the statuses of the threshold detectors have been stored in the buffer memory, the threshold detectors are configured to be reset for registration of a new measured value.

5. An arrangement according to claim 1, further comprising:
   a converter arranged between the I/Q-demodulator and the threshold detectors for selectively supplying only the I component or only the Q component to the threshold detectors successively in series.

* * * * *